United States Patent [19]

Rodemeyer

[11] 3,964,438
[45] June 22, 1976

[54] FOOD BLANKET FOR ANIMALS
[75] Inventor: Donald James Rodemeyer, City Island, N.Y.
[73] Assignee: Metaframe Corporation, Elmwood Park, N.J.
[22] Filed: June 30, 1975
[21] Appl. No.: 591,267

[52] U.S. Cl.......................... 119/1; 119/15
[51] Int. Cl.²........................ A01K 39/00
[58] Field of Search ........ 426/132; 119/17, 18, 119/1, 21, 23, 45, 51 R, 15

[56] References Cited
UNITED STATES PATENTS

| | | | |
|---|---|---|---|
| 3,122,127 | 2/1964 | Shechmeister et al.......... | 119/18 |
| 3,122,129 | 2/1964 | Wise........................ | 119/51 R |

Primary Examiner—A. Louis Monacell
Assistant Examiner—R. B. Penland
Attorney, Agent, or Firm—Stephen L. King; John G. Mesaros; Max E. Shirk

[57] ABSTRACT

Edible material is dispersed in a pad of nesting material. The pad may be placed in a container housing an animal, such as a bird or a rodent, so that the animal may discover food when it pulls tufts of nesting material from the pad.

7 Claims, 2 Drawing Figures

U.S. Patent   June 22, 1976   3,964,438
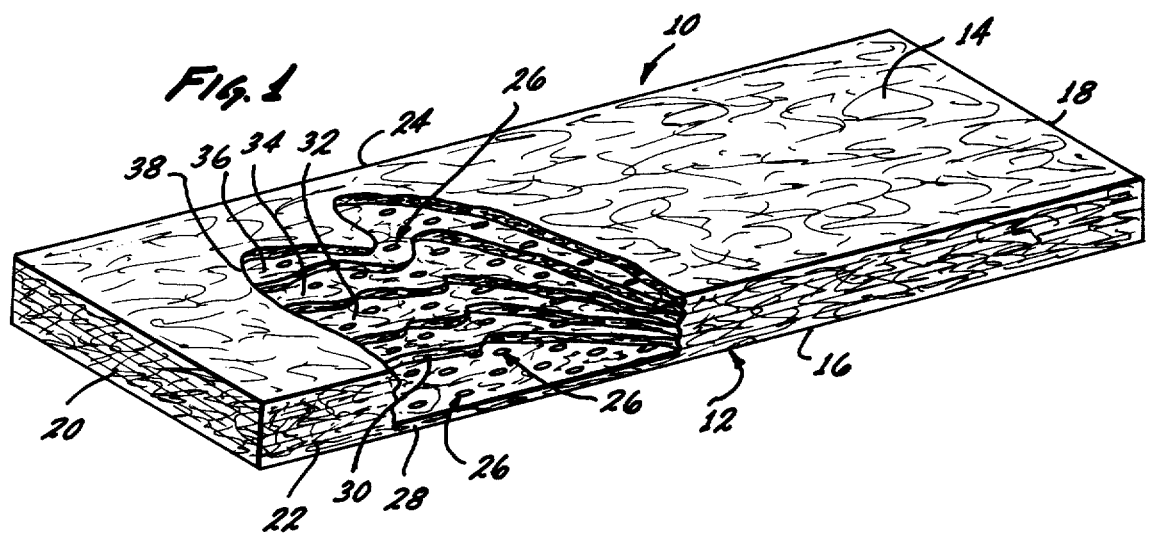
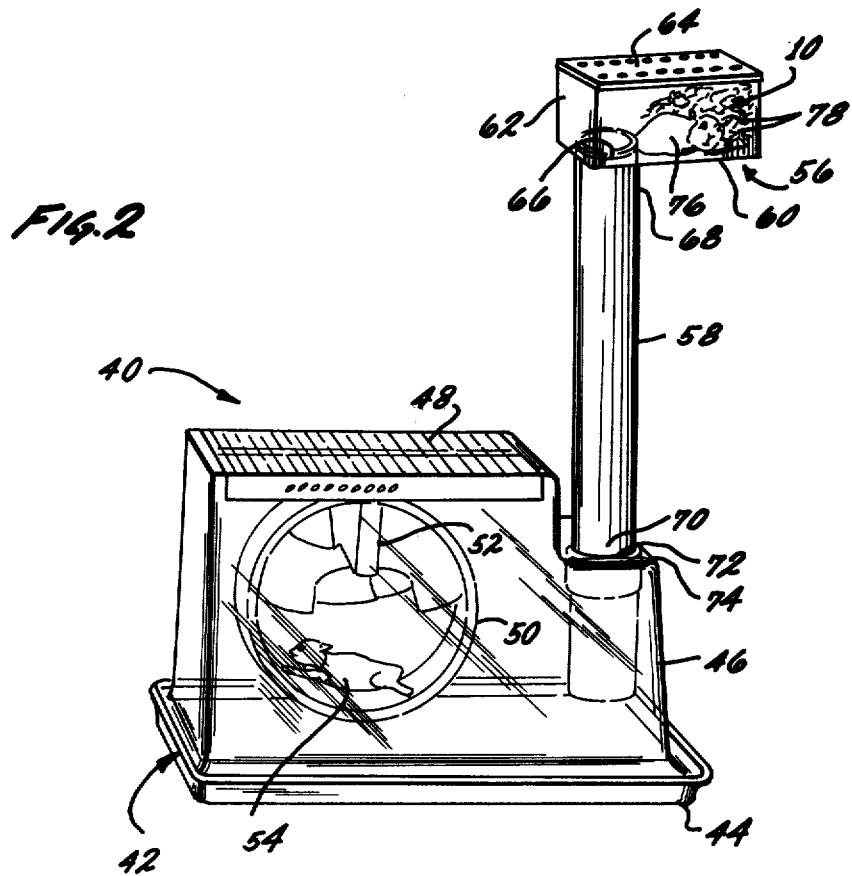

FOOD BLANKET FOR ANIMALS

BACKGROUND OF THE INVENTION

The background of the invention will be set forth in two parts.

1. Field of the Invention

The present invention pertains generally to the field of feeding and nesting animals and more particularly to a new and useful food blanket having edible material dispersed in a pad of nesting material.

2. Description of the Prior Art

The following United States patents were disclosed by a preliminary search.

| Patent No. | Inventor | Date |
|---|---|---|
| 1,990,712 | S. Rose | 2/12/1935 |
| 2,808,679 | R. E. Collins | 10/8/1957 |
| 2,235,959 | L. G. Copeman | 3/25/1941 |
| 2,463,704 | J. T. Lloyd et al | 3/8/1949 |
| 3,094,100 | G. E. Wise | 6/18/1963 |
| 3,122,129 | G. E. Wise | 2/25/1964 |

The patent to Rose discloses a container for bird seed which is provided with a cover. The cover serves as a food tray when it is removed from the container and attached to a bird cage. A bird food biscuit is attached to the inside of the cover.

The patent to Copeman relates to a suet cake container which serves as a shipping carton and which may be opened into a bird-feeding station.

The patent to Lloyd et al. relates to a device for inducing young poultry to eat. Feed which has been brightly colored by means of dyes and furnished in the form of pellets, wafers, or the like is placed on top of a supply of regular starting mash where the poults may readily see the bright colors. The poults start pecking at the brightly colored objects and get enough of the starter mash to develop a taste for it.

The patent to Collins relates to a pest exterminator having a poison disposed on the side surface of an elongated strip of suitable flexible material such as woven cloth, paper or the like.

The patents to Wise both relate to bird feeders wherein bird feed is adhesively secured to a strip of burlap or the like.

The feeders disclosed in these patents are subject to the disadvantage that an animal using the feeder cannot also use the media which carries the feed as a nesting material.

SUMMARY OF THE INVENTION

In view of the foregoing factors and conditions characteristic of animal feeders of the type described in the prior art patents discussed above, it is a primary object to the present invention to provide a new and useful food blanket not subject to the difficulty enumerated above and including a pad of nesting material having edible material dispersed within the pad.

Another object of the present invention is to provide a food blanket of the character described comprising a pad of soft, fluffy fibrous material having at least two plies with edible material distributed in the pad between the plies.

According to one aspect of the present invention, a food blanket is provided which includes several plies of soft, fibrous material which may be built up into layers approximately 1½ inches thick, 4 inches wide and 12–14 inches long. An edible material, such as oats, bird seed or other suitable grain, may be distributed in the pad between the plies. The pad may be made from polyester, cotton or wool materials and may be brightly colored, if desired.

According to another aspect of the invention, an eating-nesting station is provided. The station includes a container for housing an animal and a food blanket provided in the container for feeding and nesting the animal.

The features of the present invention which are believed to be novel are set forth with particularity in the appended claims. The present invention, both as to its organization and manner of use, together with further objects and advantages thereof, may best be understood by reference to the following description, taken in connection with the accompanying drawing in which like reference numerals refer to like elements in the several views.

BRIEF DESCRIPTION OF THE DRAWING

FIG. 1 is a perspective view, with parts broken away to show internal construction, of a food blanket constituting one aspect of the present invention; and FIG. 2 is a perspective view of a feeding-nesting station constituting another aspect of the present invention.

DESCRIPTION OF THE PREFERRED EMBODIMENT

Referring again to the drawing, and more particularly to FIG. 1, a food blanket constituting a presently preferred embodiment of the invention, generally designated 10, includes a pad or mat 12 having a top surface 14, a bottom surface 16, ends 18, 20 and sides 22, 24.

Food blanket 10 also includes an edible material 26 which may be either randomly or uniformly distributed in pad 12.

Pad 12 may be made in any suitable size, depending upon the market for food blanket 10. For example, it has been found that pads about 1½ inches thick, 4 inches wide and 12–14 inches long are satisfactory for the hamster market. The pads are folded over and stuffed into transparent bags which may be displayed on racks in pet stores.

Pad 12 may be made from any suitable fluffy material like cotton, wool or polyester. It has been found that polyester materials come in brighter colors than cotton or wool materials and are more attractive to prospective purchasers and to the hamsters.

Edible material 26 may be any suitable material for consumption by the animal which will use food blanket 10. For example, it has been found that oats is a satisfactory treat for hamsters. It is not intended to replace their regular diet, but is an added delicacy to be enjoyed by the hamster while it builds a nest by removing small tufts of material from pad 12. Edible material 26 may be placed in pad 12 by separating the material in the pad and scattering edible material 26 randomly about within the pad. Alternatively, pad 12 may be built up in plies, as shown at 28, 30, 32, 34, 36 and 38. This may be done by starting with ply 28 and by placing edible material 26 on the top of ply 28. Ply 30 may then be placed on top of the edible material on ply 28 and a layer of edible material 26 may then be placed on top of ply 30 after which ply 32 is added. After edible material has been placed on top of ply 32, ply 34 may be added; then another layer of edible material; then ply 36; then another layer of edible material 26 on top of which is placed ply 38.

Referring now to FIG. 2, another aspect of the invention comprises an eating-nesting station 40 including an animal habitat 42 having a bottom wall 44, and an upstanding, encompassing side wall 46 and a removable cover 48. An exercise wheel 50 may be rotatably mounted in habitat 42 on a bracket 52 for use by a hamster 54 housed in habitat 42.

An eating-nesting station 56 communicates with habitat 42 through a hollow tube 58 and includes a bottom wall 60, an upstanding, encompassing side wall 62 and a removable cover 64. Bottom wall 60 is provided with an aperture 66 which receives one end 68 of hollow tube 58. The other end 70 of tube 58 passes through an aperture 72 provided in a top wall 74 provided on habitat 42 below cover 48.

A second hamster 76 is shown in station 56 amongst a plurality of tufts 78 from food blanket 10 to depict somewhat schematically the burrowing of hamster 76 into pad 10 after the hamster has torn the pad apart to get at the edible material. It should be understood that only a small segment of pad 10 is placed in station 56 at one time. For example, a 2 × 2 inch piece may be removed from pad 10 each day and placed in station 56.

While the particular food blanket and eating-nesting station herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims which form a part of this disclosure.

Whenever the term "means" is employed in these claims, this term is to be interpreted as defining the corresponding structure illustrated and described in this specification or the equivalent of the same.

What is claimed is:
1. A food blanket for feeding and nesting an animal, comprising:
   a pad of soft, fluffy fibrous material, said pad having at least two plies; and
   edible material distributed in said pad between said plies.
2. A food blanket for feeding and nesting an animal, comprising:
   a pad of fluffy polyester material, said pad having a plurality of plies; and
   animal food dispersed in said pad between said plies.
3. An eating-nesting station for an animal comprising:
   1. a container for housing said animal; and
   2. an eating-nesting material provided in said container for feeding and nesting said animal, said eating-nesting material comprising:
      A. a pad of soft, fluffy material; and
      B. edible material dispersed in said pad.
4. The combination recited in claim 3 wherein said pad is made from a polyester material.
5. An eating-nesting station for an animal, comprising:
   1. a container for housing said animal; and
   2. an eating-nesting material provided in said container for feeding and nesting said animal, said eating-nesting material comprising:
      A. a pad of soft, fluffy material, said pad including at least two plies; and
      B. edible material dispersed in said pad between said plies.
6. The combination recited in claim 5 wherein said edible material is a grain.
7. The combination recited in claim 5 wherein said edible material is bird seed.

* * * * *